United States Patent [19]

Rogers

[11] Patent Number: 4,549,575

[45] Date of Patent: Oct. 29, 1985

[54] BREAKAWAY FLUID SYSTEM

[75] Inventor: Russell L. Rogers, Munith, Mich.

[73] Assignee: Aeroquip Corporation, Jackson, Mich.

[21] Appl. No.: 624,957

[22] Filed: Jun. 27, 1984

[51] Int. Cl.[4] ............................................. F16L 37/28
[52] U.S. Cl. ............................ 137/614.03; 137/899.2; 285/316
[58] Field of Search ...................... 137/614.04, 614.03, 137/899.2; 285/316

[56] References Cited

U.S. PATENT DOCUMENTS

| | | | |
|---|---|---|---|
| 1,345,571 | 7/1920 | Yates | 137/614.04 |
| 2,666,656 | 1/1954 | Bruning | 285/35 |
| 2,674,469 | 4/1954 | Earle et al. | |
| 2,765,181 | 10/1956 | Butterfield | |
| 2,860,893 | 11/1958 | Clark | 285/1 |
| 3,097,865 | 7/1963 | Zeeb et al. | 285/1 |
| 3,140,102 | 7/1964 | Johnson | 280/421 |
| 3,317,220 | 5/1967 | Bruning | 285/1 |
| 3,409,045 | 11/1968 | Mackey et al. | 137/614.04 |
| 3,520,331 | 7/1970 | Locke et al. | 137/614.04 |
| 3,537,478 | 11/1970 | Evans et al. | 137/614.04 |
| 3,549,175 | 12/1970 | Evans | 285/1 |
| 3,567,255 | 3/1971 | Evans | 285/1 |
| 3,781,039 | 12/1973 | Locke et al. | 285/1 |
| 4,082,112 | 4/1978 | Schmidt | 137/614.04 |

Primary Examiner—A. Michael Chambers
Assistant Examiner—John C. Fox
Attorney, Agent, or Firm—Beaman & Beaman

[57] ABSTRACT

The invention pertains to a breakaway coupling for use with fluid systems wherein self-sealing coupling parts are interconnected by locking structure including a tubular displaceable operating member sealingly associated with a flexible conduit comprising a portion of the fluid system. Predetermined tension within the flexible conduit displaces the operating member to a coupling release position permitting the coupling parts to disengage and seal with minimum fluid loss.

4 Claims, 2 Drawing Figures

BREAKAWAY FLUID SYSTEM

BACKGROUND OF THE INVENTION

Self-sealing "breakaway" fluid couplings are utilized in applications where tension forces applied to conduits will rupture the conduits, or associated fittings. Such couplings are used with agricultural equipment such as tractor-drawn farm implements having automatic releasing hitches, and breakaway couplings are often required by aircraft specifications for "crashworthy" fuel systems whereby fuel tanks are interconnected by breakaway couplings to prevent fuel loss during impact.

Crashworthy couplings may utilize frangible components for maintaining the coupling parts connected during normal use, or reusable couplings may employ spring biased locking structure released by tension forces such as disclosed in U.S. Pat. Nos. 2,860,893; 3,140,102 and 3,781,039.

It is an object of the invention to provide a breakaway or crashworthy fluid coupling which is dependable in operation and economical to manufacture and assemble.

Another object of the invention is to provide a breakaway coupling utilizing a pair of body parts each housing seal-sealing valves therein radially displaceable detents are selectively positionable within a groove and maintained therein by a retainer, the retainer directly sensing the axial forces within the conduit system associated with the coupling.

A further object of the invention is to provide a breakaway coupling having self-sealing valves incorporated within releasable body parts, the parts utilizing latching structure employing an annular axially displaceable operating member, and a conduit being directly attached to the operating member whereby tension forces within the conduit are directly imposed upon the operating member.

In the practice of the invention, the coupling consists of a pair of body parts each having a passage defining a flow path and a spring biased self-sealing valve is located within each flow path. The body parts include latching structure for maintaining the parts in a coupled relationship, and when coupled, the self-sealing valves operatively engage and are axially displaced to an open condition permitting fluid flow through the coupling.

The latching structure includes radially movable detents in the form of balls and an annular retainer for radially positioning the ball detents. The retainer comprises a tubular latch operating member and one of the flexible conduits associated with the coupling is sealingly affixed directly to the operating member.

A spring biases the operating member toward the detent retaining position, yet sufficient axial force imposed upon the conduit attached to the operating member displaces the operating member to permit release of the detents, and disengagement of the coupling parts.

As the operating member is sealed with respect to its associated body part, the coupling is fluid tight, and the direct association of the conduit with the latch operating member produces a concise assembly of low cost and dependable operation.

BRIEF DESCRIPTION OF THE DRAWINGS

The aforementioned objects and advantages of the invention will be appreciated from the following description and accompanying drawings therein.

DESCRIPTION OF THE PREFERRED EMBODIMENT

Figure 1:
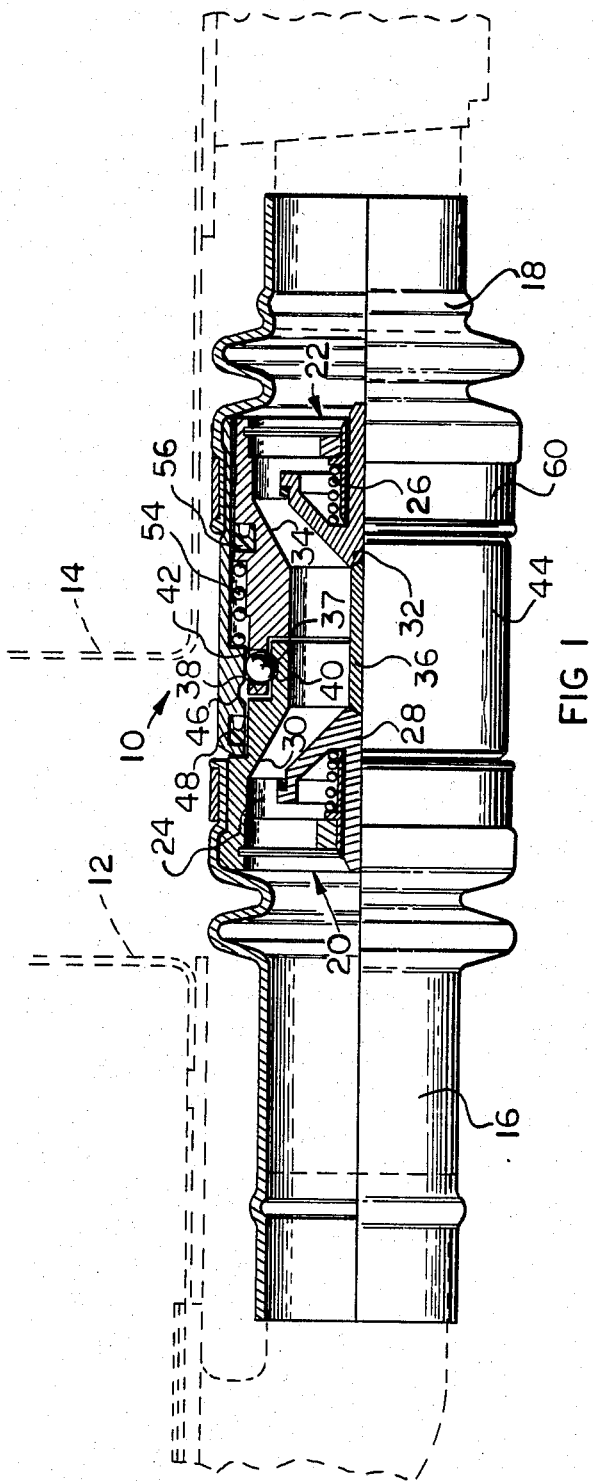
FIG. 1 is an elevational view of a coupling in accord with the invention illustrated in the interconnected locked condition, the upper half of the coupling being shown in section.
Figure 2:
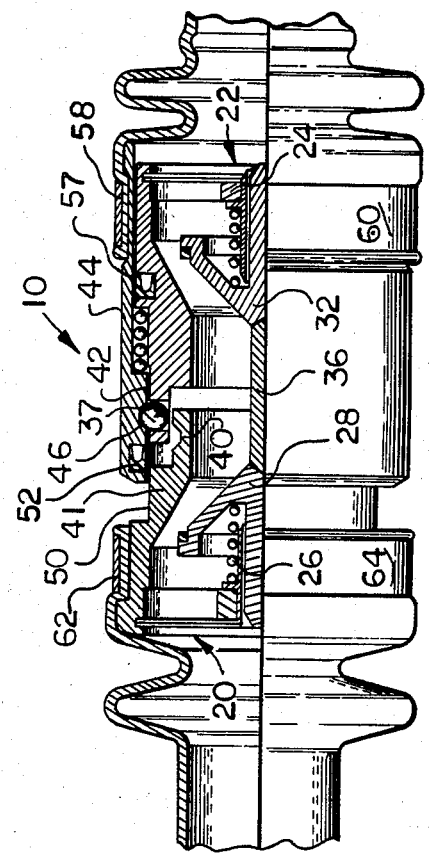
FIG. 2 is an elevational detail view, partially sectioned, illustrating the coupling components in a released condition during the initial stage of disengagement.

In the drawings, the coupling 10 is illustrated as interconnecting tanks 12 and 14, such as fuel tanks of an aircraft. The tank 12 includes a flexible hose conduit 16 while the tank 14 includes in its system a flexible hose conduit 18. The coupling interconnects the flexible conduits 16 and 18, and it is the purpose of the coupling 10 to be crashworthy wherein upon impact and displacement of the tanks and tensioning of the hoses, the coupling releases with minimum fuel loss to reduce the fire hazard.

The coupling 10 includes annular body parts 20 and 22, and each body part includes a spider 24 supporting self-sealing valve structure biased toward a closed condition by a compression spring 26. The valve 28 moves to the right, FIG. 1, to seal against the conical surface 30, while the valve 32 of the body part 22 seals against the conical surface 34.

A bridging insert 36 is placed between the valves as the body parts are coupled whereby interconnection of the body parts axially positions the valves 28 and 32 in their fully opened condition as represented in FIG. 1.

The coupling latching structure includes a plurality of ball detents 37 retained within holes defined in the nose 38 of part 22, and such ball detents are well known in the coupling art.

An annular groove 40 is defined in the nose 41 of part 20 for receiving the ball detents 37 when the coupling parts are in the fully coupled position, and the detents are maintained within the groove 40 by an annular cylindrical retaining surface 42 defined upon the latch operating member 44.

The operating member 44 includes a groove 46 adjacent the retaining surface 42 for receiving the detents 37 to permit release thereof from the groove 40, and the member includes an outer region 48 which overlies the nose 41 of the part 20 and the part cylindrical surface 50. An annular seal 52 defined in the outer region of the member 44 sealingly slidingly engages the surface 50.

The member 44 is biased toward the left, FIG. 1, by a compression spring 54 interposed between body part 22 and member 44 and the member is sealed to the body part 22 by sealed ring 56 engaging cylindrical surface 57 by member 44.

The inner end region of the member 44 includes an annular recess 58 and the flexible hose 18 is compressed into the recess and maintained therein by compression band 60 whereby a sealing relationship exists between the member 44 and the flexible hose 18.

The flexible hose 16 is sealingly attached to the cylindrical recess 62 defined on the body part 20, and compression band 64 assures a sealed relationship with the body part.

To couple the body parts together the bridging insert 36 is located between the valves 28 and 32, and the operating member 44 is manually moved to the right to align the groove 46 with the ball detents 37. Thereupon, the nose 41 may be inserted within the outer region 48 of the member 44 until the groove 40 aligns with the ball detents, and the member 44 may be released for movement to the left by the action of spring 54 permitting the oblique surface of the groove 46 to force the detents 37 into the groove 40, and aligning the ball detents with the retaining surface 42 to maintain the body parts locked in the fully coupled operative condition of FIG. 1.

In the event of a crash or impact sufficient to excessively tension the hoses 16 or 18, the direct attachment of the hose 18 to the operating member 44 will pull the operating member to the right upon body part 22 compressing spring 54, and upon the alignment of the groove 46 with the ball detents 37 the balls will be forced into the groove 46 and the body parts will uncouple. As the body parts uncouple, the springs 26 bias the valves 28 and 32 toward their seats 30 and 34, respectively, and the body parts will self-seal with minimal fuel loss.

The direct attachment of the hose 18 to the operating member 44 insures the desired releasing operation of the coupling, and minimizes the coupling structure required to achieve the desired result while maintaining a concise coupling configuration. As the operating member is sealed with respect to both body parts, no fluid loss will occur during normal conditions, and the coupling has a clean attractive appearance free of protuberances which might hamper the releasing operation.

It is appreciated that various modifications to the inventive concepts may be apparent to those skilled in the art without departing from the spirit and scope of the invention.

I claim:

1. A self-sealing breakaway fluid coupling for a flexible hose conduit system characterized by its economy of manufacture and dependable operation comprising, in combination, first and second annular body parts each having an axis, a flow passage, a conduit attachment end, and a connecting end, conduit attachment means defined adjacent said first part conduit attachment end comprising an annular cylindrical recess defined in said first body part, a first hose conduit having an end received upon said recess, a first compression band encompassing said first hose conduit end in radial alignment with said recess compressing said first hose conduit end into said recess in a sealed relationship, a spring biased self-closing valve within each body part flow passage operatively engagable with each other upon the parts being interconnected to hold the valves open, releasable locking means interposed between said body parts at said connecting ends selectively locking said parts in interconnected relationship, said locking means comprising an axially displaceable annular operating member mounted on said second body part movable between a locking position and a release position, spring means biasing said operating member toward said locking position, an annular cylindrical recess defined upon said operating member, a second hose conduit having an end received upon said member recess, a second compression band encompassing said second hose conduit end in radial alignment with said member recess compressing said second hose conduit end into said member recess in a sealed relationship, and sealing means sealing said operating member to said first and second body parts when said operating member is in said locking position to seal said first and second body parts relative to each other when said parts are interconnected and said valves are open.

2. In a self-sealing breakaway fluid coupling as in claim 1, said locking means including radially movable detents mounted upon said second body part, a radially extending detent receiving groove defined upon said first body part in radial alignment with said detents upon said body parts being fully connected, and an annular cam and detent retaining surface defined upon said operating member radially displacing said detents inwardly into said groove.

3. In a self-sealing breakaway fluid coupling as in claim 2, said detents comprising balls.

4. In a self-sealing breakaway fluid coupling as in claim 2, said operating member including an outer open region encompassing a portion of said first body part when said body parts are coupled and an inner region concentric to said second body part, said member inner region including a cylindrical inner surface, said sealing means including a first annular seal ring mounted upon said second body part engaging said cylindrical inner surface, and a second annular seal ring mounted upon said operating member outer region engaging a cylindrical surface defined upon said first body part.

* * * * *